Aug. 13, 1957 S. HILLMAN 2,802,526
MACHINE FOR OPERATING ON NUT BLANKS
Filed Feb. 26, 1954 11 Sheets-Sheet 7
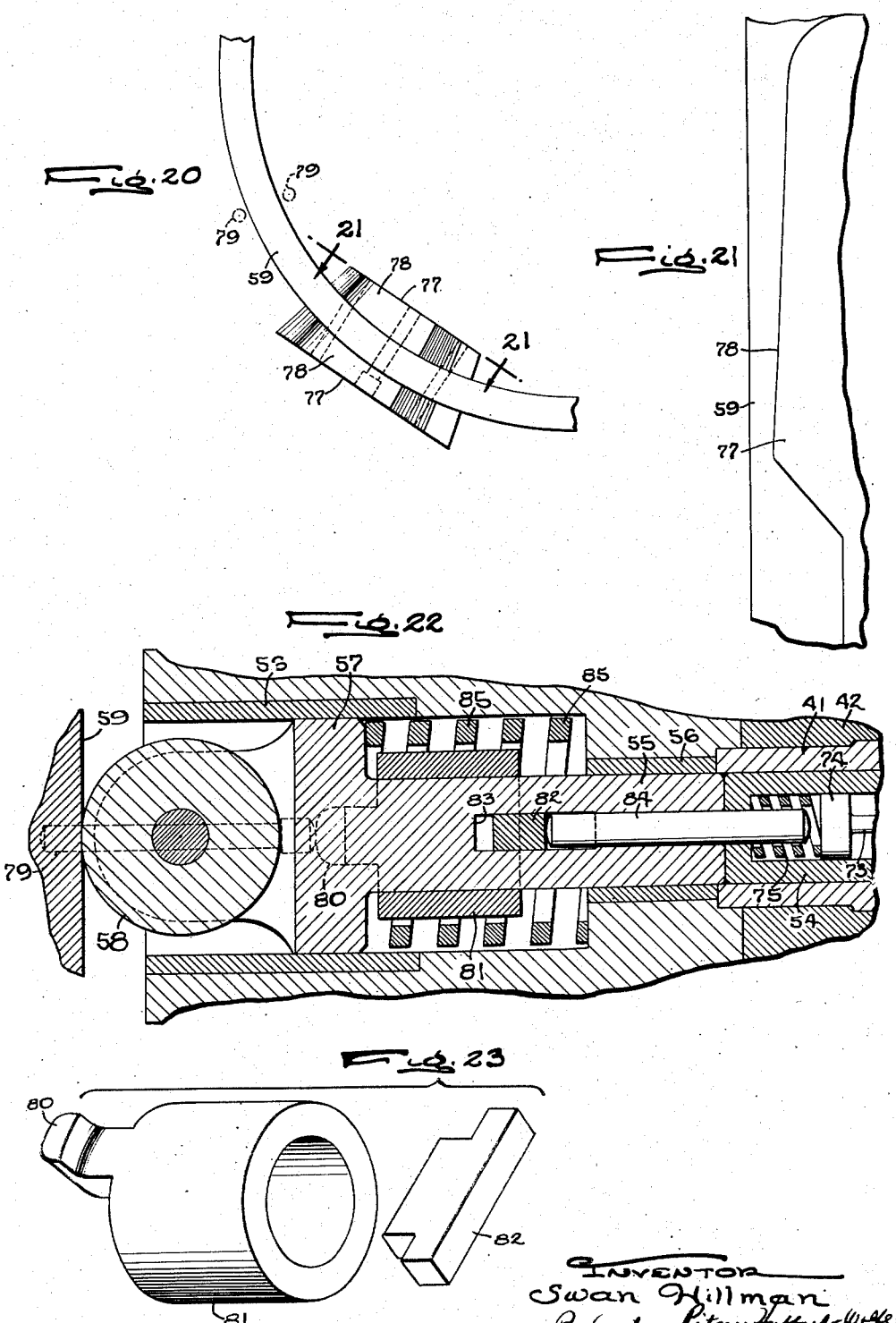

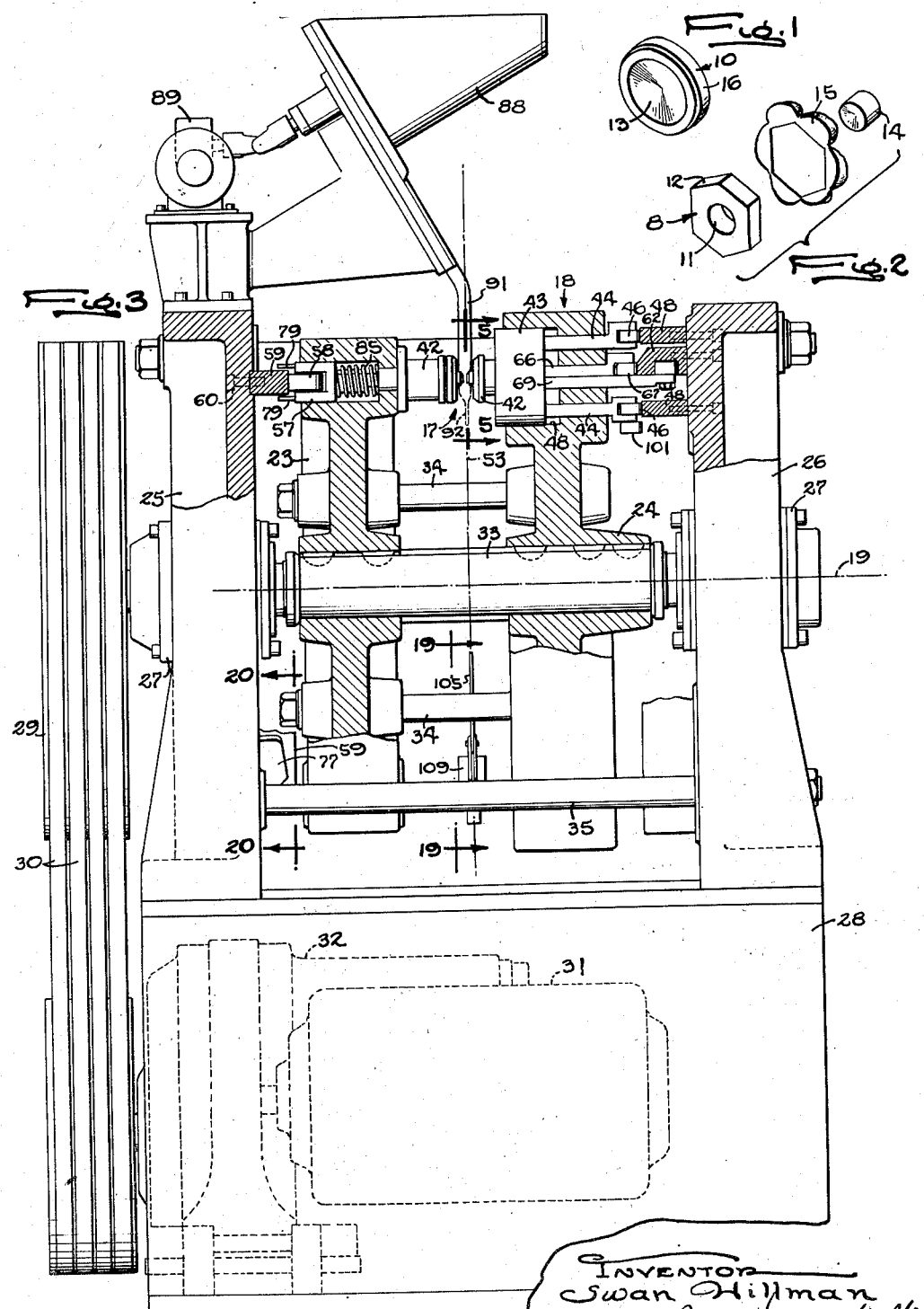

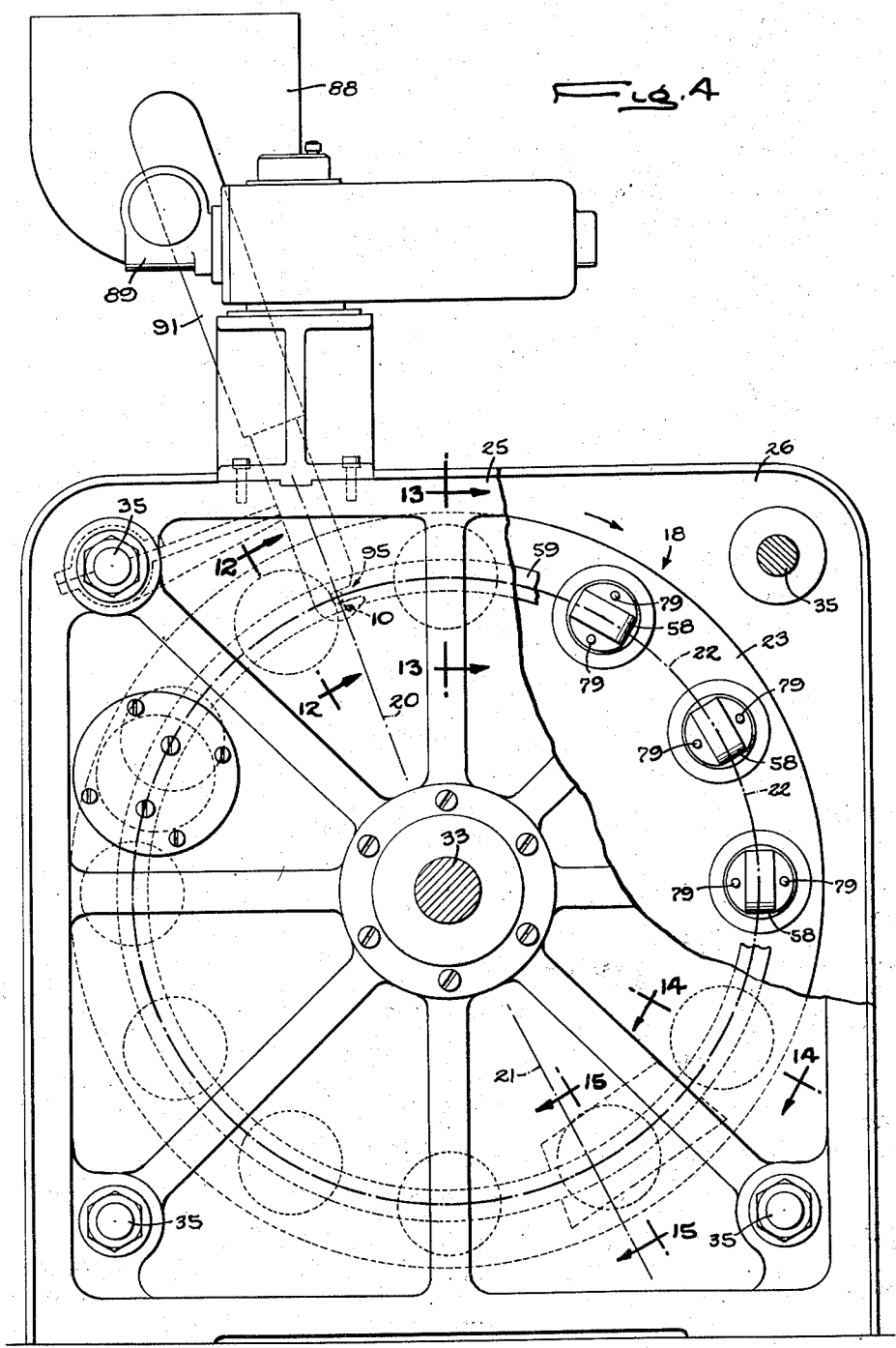

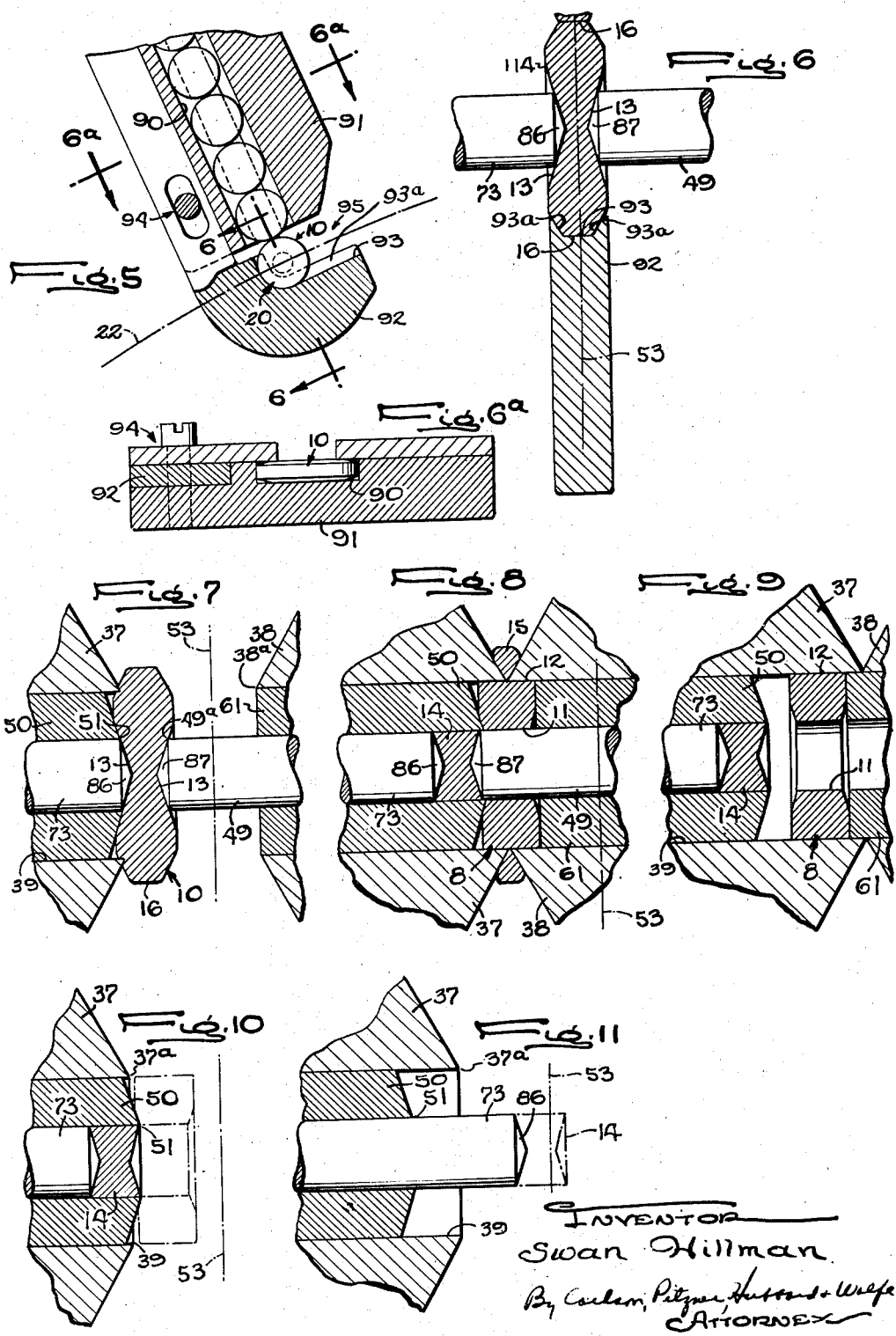

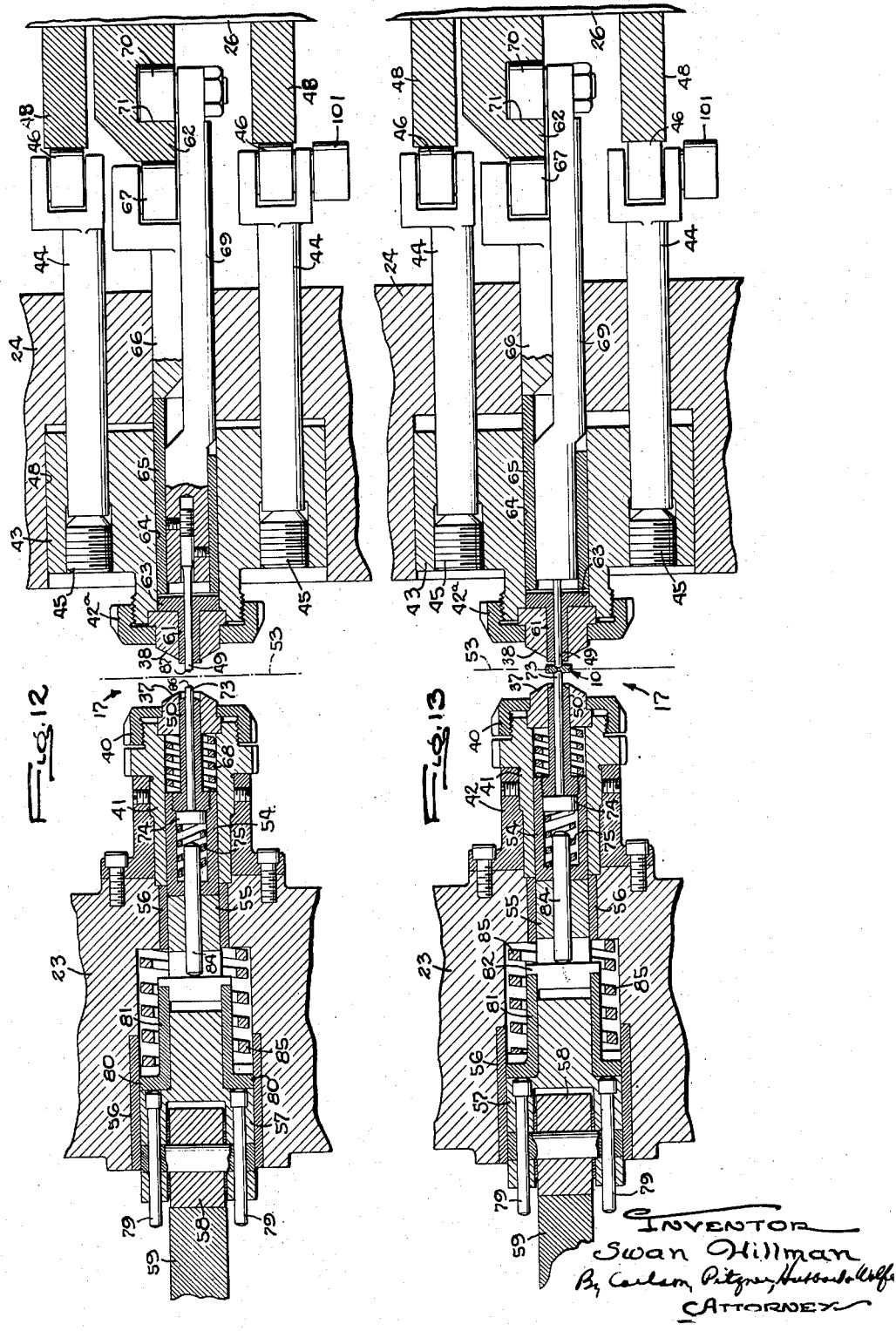

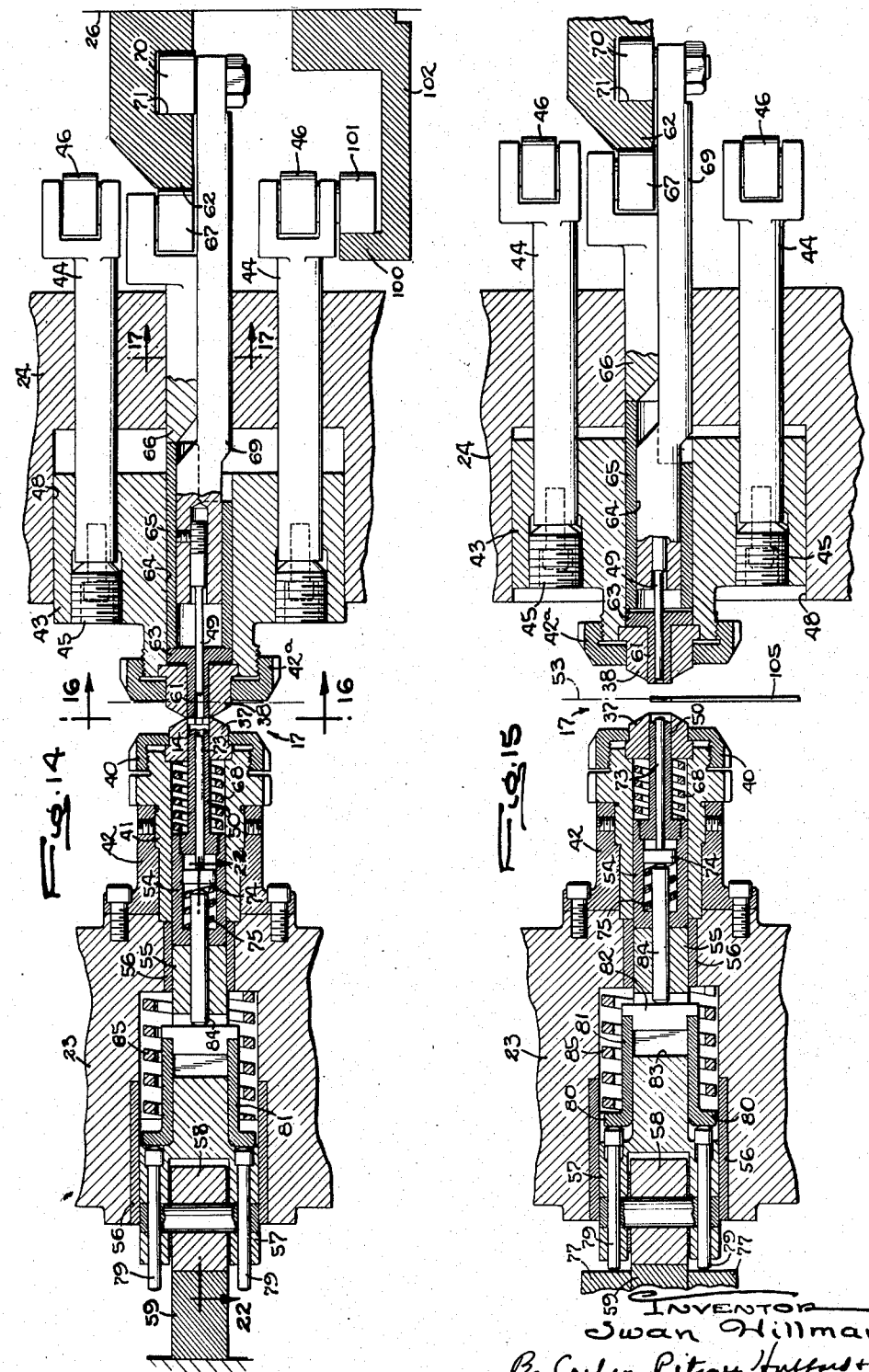

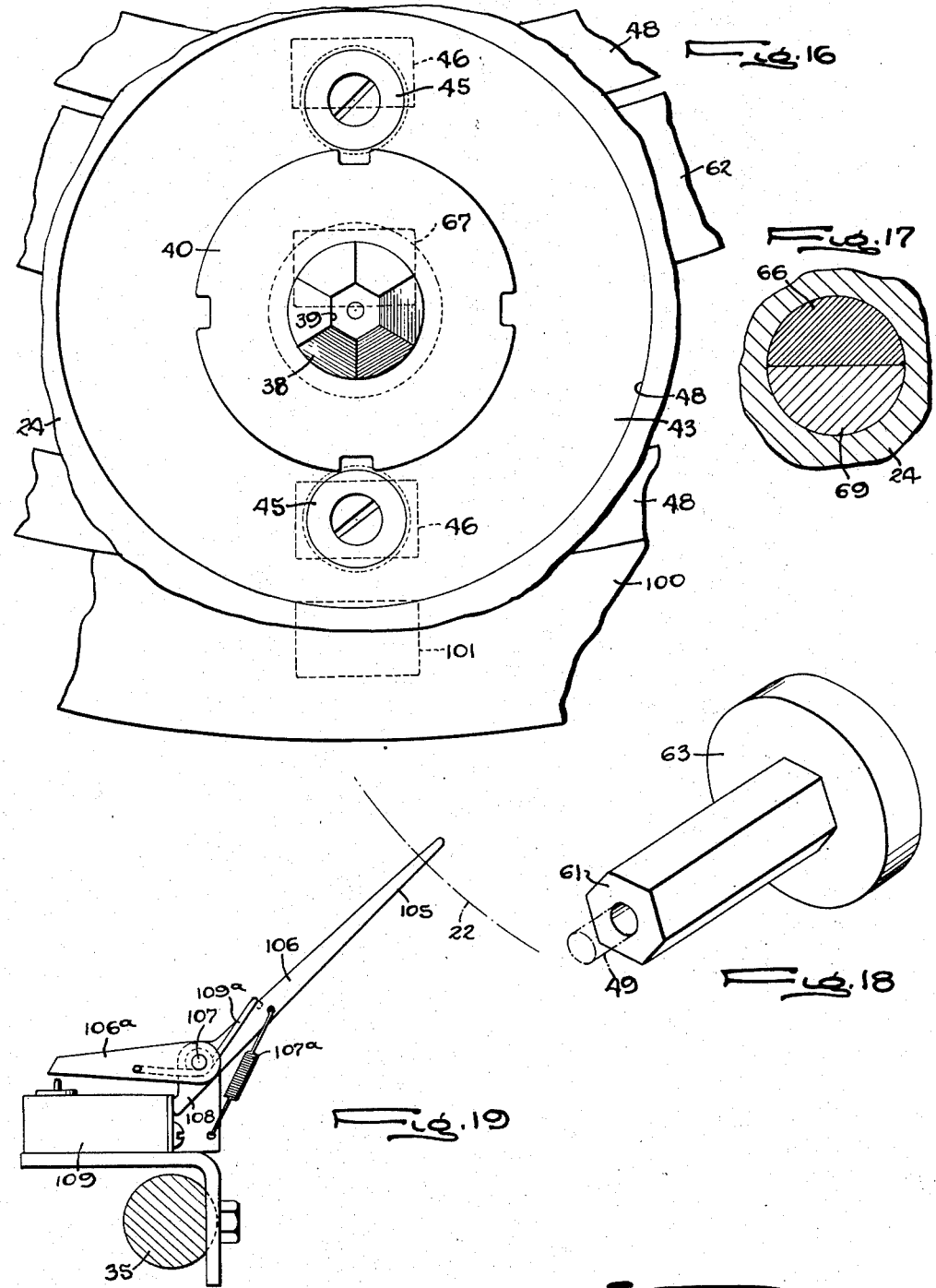

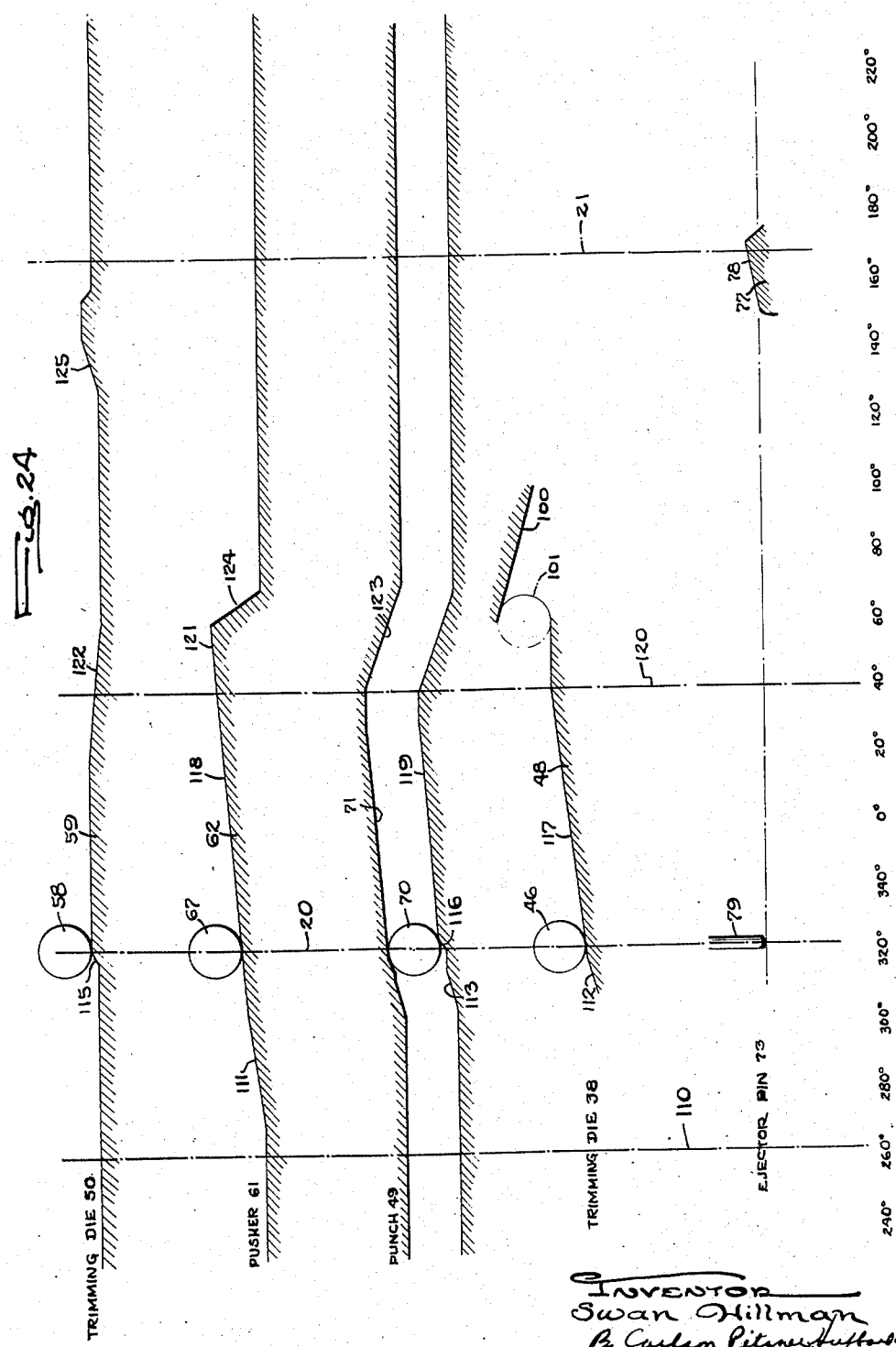

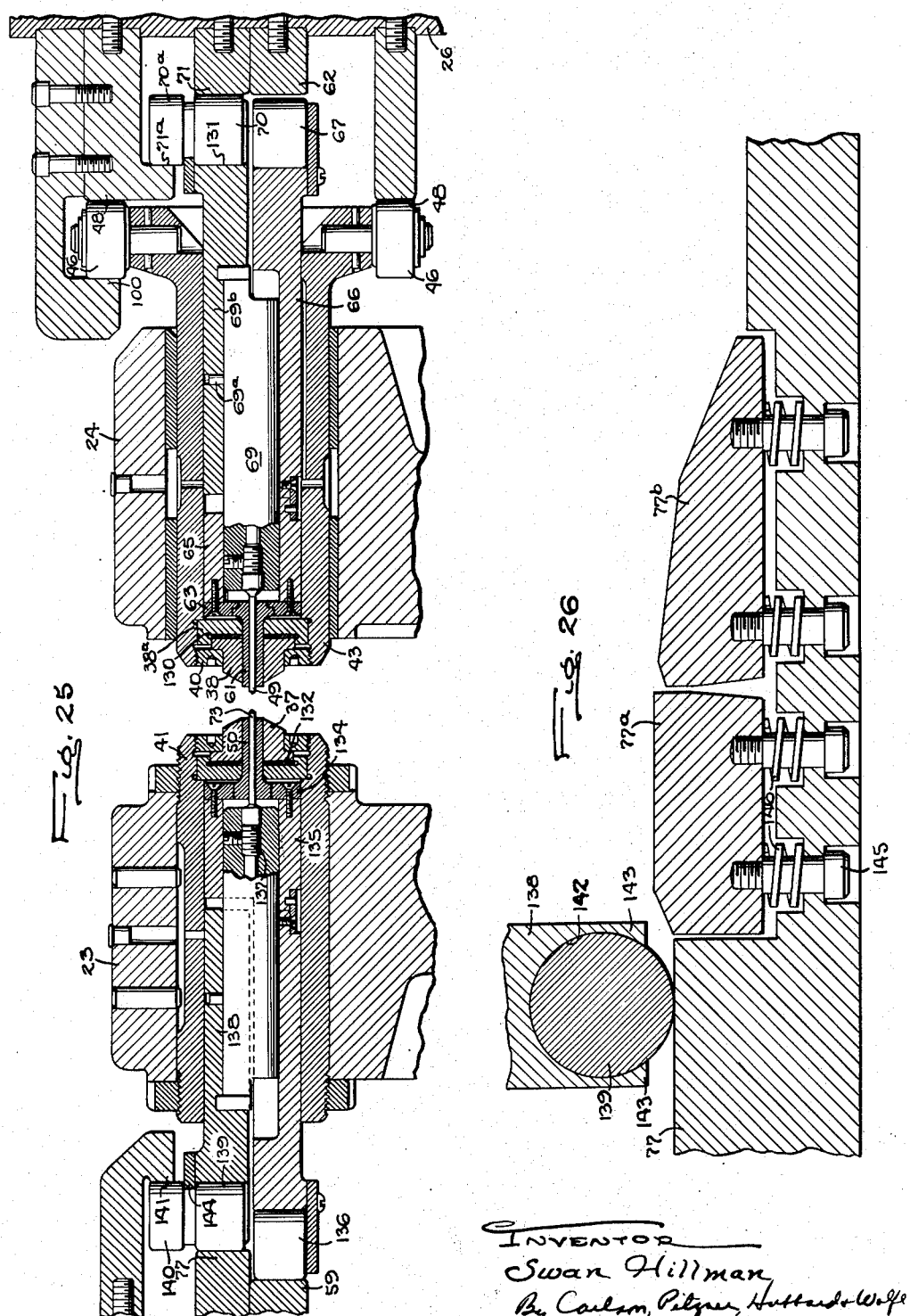

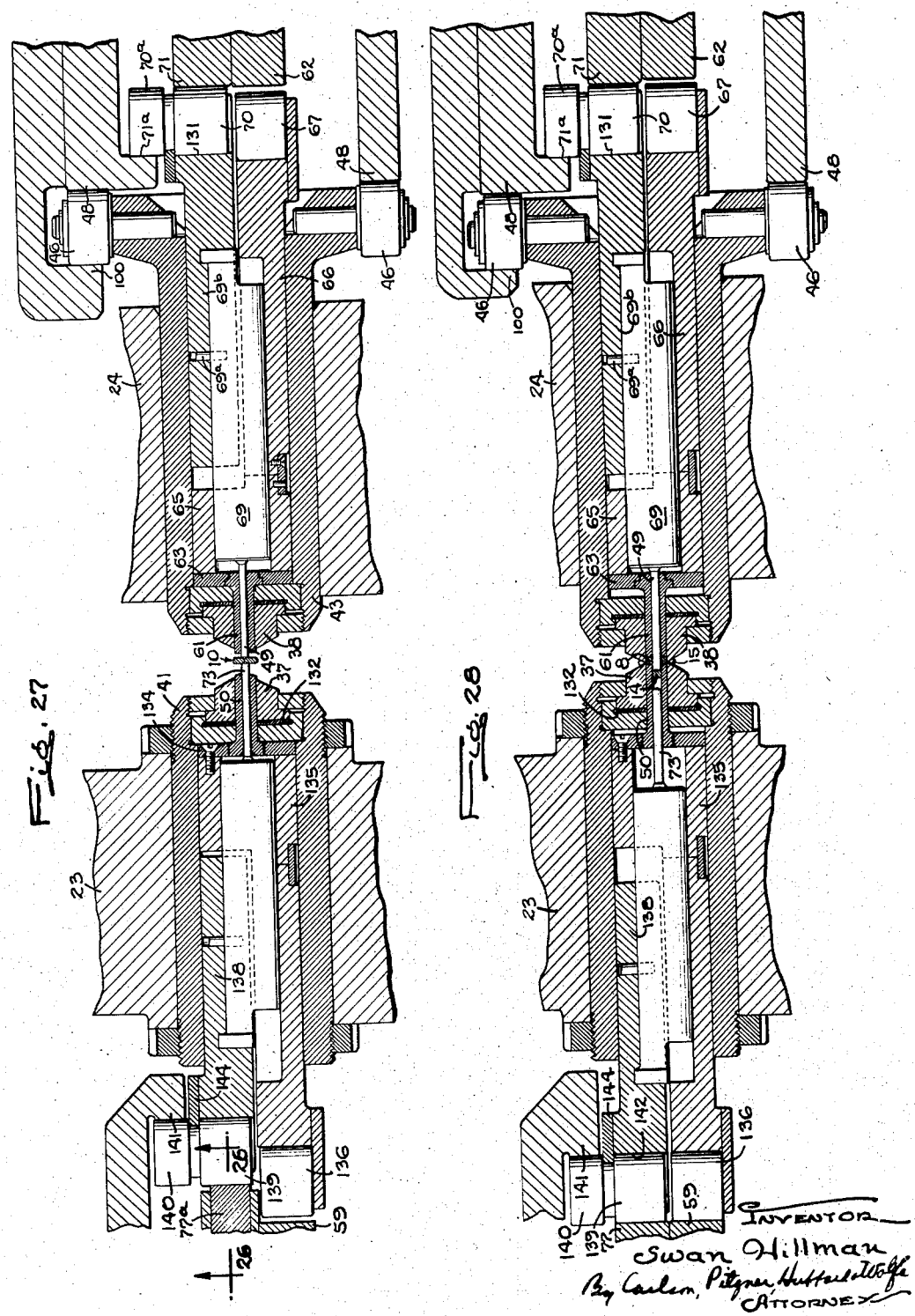

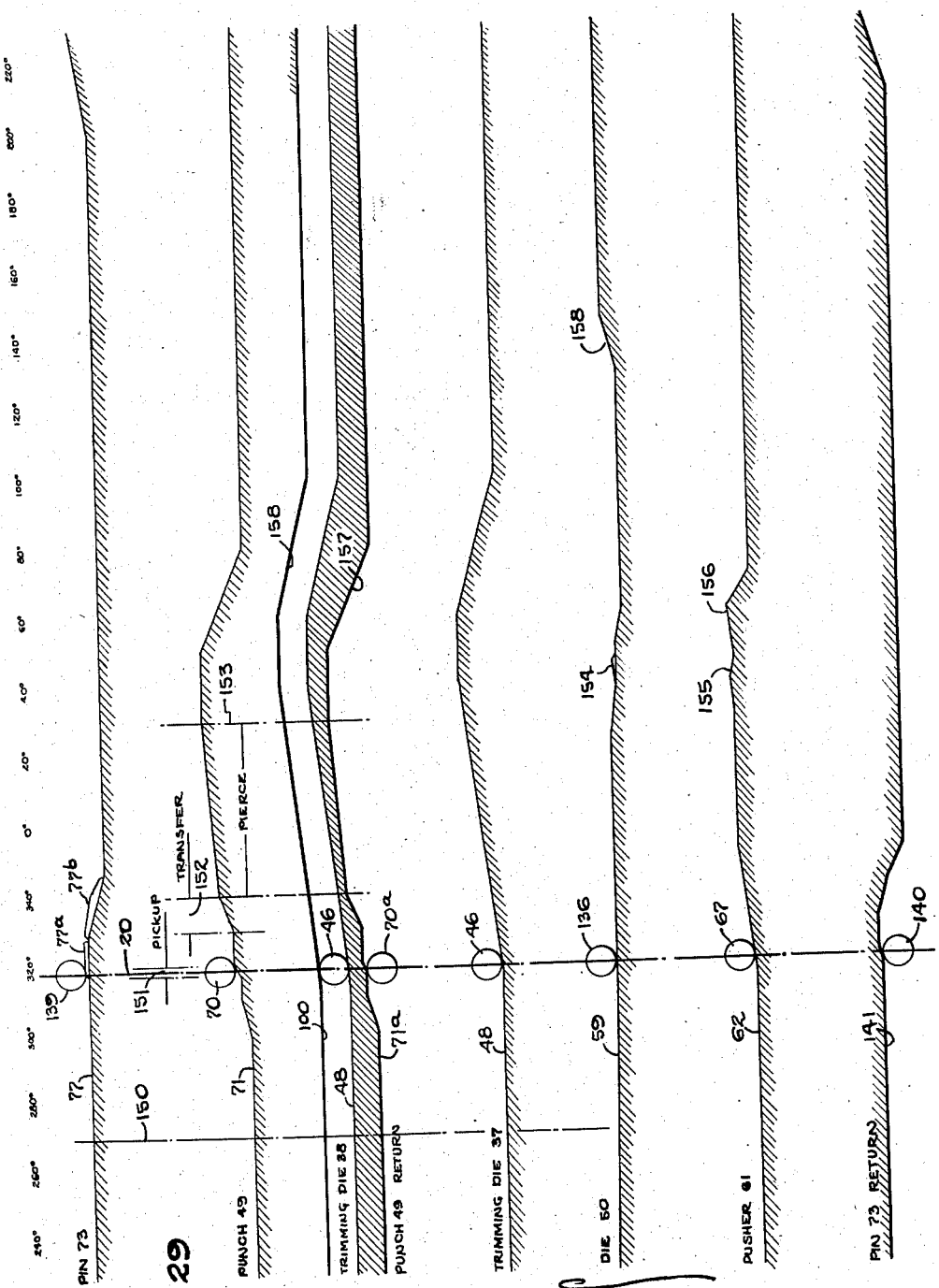

United States Patent Office 2,802,526
Patented Aug. 13, 1957

2,802,526

MACHINE FOR OPERATING ON NUT BLANKS

Swan Hillman, Rockford, Ill.

Application February 26, 1954, Serial No. 412,707

16 Claims. (Cl. 164—12)

This invention relates to a machine for operating on a succession of nut blanks to perform thereon one or more material removing operations such as piercing a center hole, trimming the exterior to a desired polygonal contour, or tapping the hole. The invention has more particular reference to machines of the type in which a plurality of nut blanks are operated upon simultaneously as they are carried around a circular path between loading and unloading positions.

The general object of the invention is to provide a nut working machine of the above character having a continuously rotating tool carrier and novel means for delivering the nut blanks to the successive tools while the latter are turning at a speed such as to provide a production rate substantially higher than has been attained heretofore.

Another object is to provide for automatic hopper feeding of the nut blanks into operative position with respect to the tools on the continuously turning carrier.

A more detailed object is to associate a pair of nut gripping elements with each set of tools and to actuate these elements in timed relation to their movement past the loading position whereby to pick up a nut from such position and locate the same for proper operation of the associated tools thereon.

A further object is to adapt the machine for the performance on each of the nut blanks of a plurality of material removing operations such as piercing and trimming.

The invention also resides in the novel structural character of the mechanisms for feeding the nut blanks successively to the loading position and for actuating the blank gripping elements to pick the successive blanks out of this position.

Other objects and advantages of the invention will become apparent from the following detailed description taken in connection with the accompanying drawings, in which Figure 1 is a perspective view of a nut blank adapted to be operated upon in accordance with the present invention.

Fig. 2 is a perspective view of the finished nut blank and the pieces of metal removed therefrom.

Fig. 3 is a front elevational view of a machine embodying the novel features of the present invention, certain parts being broken away and shown in vertical section.

Fig. 4 is a side elevational view with certain parts broken away.

Fig. 5 is a fragmentary sectional view taken along the line 5—5 of Fig. 3.

Figs. 6 and 6ª are fragmentary sectional views taken respectively along the lines 6—6 and 6ª—6ª of Fig. 5.

Figs. 7 to 11 are fragmentary diametrical sectional views showing the tools in various positions.

Figs. 12, 13, 14, and 15 are fragmentary cross sectional views of the tools and actuators therefor when in positions indicated by the lines 12—12, 13—13, 14—14, and 15—15 of Fig. 4.

Fig. 16 is a view taken along the line 16—16 of Fig. 14.

Fig. 17 is a fragmentary section taken along the line 17—17 of Fig. 14.

Fig. 18 is a perspective view of one of the pushing tools.

Fig. 19 is a fragmentary sectional view taken along the line 19—19 of Fig. 3.

Fig. 20 is a fragmentary view taken along the line 20—20 of Fig. 3.

Fig. 21 is a fragmentary view taken along the line 21—21 of Fig. 20.

Fig. 22 is a fragmentary sectional view taken along the line 22—22 of Fig. 14.

Fig. 23 is a perspective view of certain parts shown in Fig. 22.

Fig. 24 is a combined cam development view and time chart.

Fig. 25 is a view similar to Fig. 12 showing a modified construction of the punching and trimming dies and their actuating cams.

Fig. 26 is a fragmentary section taken along the line 26—26 of Fig. 27.

Figs. 27 and 28 are views similar to Fig. 25 but showing different positions of the dies.

Fig. 29 is a cam development view and time chart of the modified machine.

While the present invention, in several of its aspects, is suited for use in performing other material removing operations on nut blanks, it is shown in the drawings for purposes of illustration incorporated in a machine for operating on blanks 10 to pierce a hole 11 (Fig. 2) in the center thereof and also trim the exterior to a hexagonal or other desired contour 12 and produce a finished blank 8. Each blank comprises a generally circular disk (Fig. 1) having shallow conical recesses 13 in opposite sides thereof converging inwardly from a diameter only slightly smaller than the outside diameter of the disk, the apices of the coned surfaces coinciding accurately with the disk axis. Near the outer edge of the blank, the end surfaces converge toward each other to a cylindrical peripheral surface 16 of narrow axial width. The hole 11 is formed by punching out a slug 14 while a ring 15 of metal is sheared from the outer edge portion of the blank to trim the latter.

Generally stated, the piercing and trimming operations are performed by a series, twelve in the present instance, of sets 17 of tools spaced equidistantly apart around a drum-like carrier 18 which rotates continuously about an axis 19 to carry each tool set in a circular path 22 of comparatively large diameter (for example, 20 inches) past a loading position 20 (Figs. 4, 5 and 24) at which a nut blank is picked up, positioned between the tools of the set, and carried along with the latter around the path 22. In substantially less than a full revolution of such travel, stationary cams at opposite ends of the carrier move the tools axially back and forth relative to each other and the carrier to pierce and trim the blank which is finished and released from the tools at the position 21 (Figs. 4 and 24). To facilitate automatic hopper feeding of blanks into the loading position, as well as gravitational release of the finished blanks, the slug 14, and the trimming 15, the carrier 18 preferably turns about a horizontal axis.

The tool carrier 18 comprises two heavy disk-like castings 23 and 24 (Fig. 3) axially spaced apart with their hubs keyed rigidly to a shaft 33 which is journaled in bearings 27 mounted in rigid parallel plates 25 and 26 upstanding from and secured to a base 28 beyond opposite ends of the carrier. Beyond the plate 25, the shaft carries pulleys 29 continuously rotated through belts 30 from a motor 31 and a speed reducer 32. At angularly spaced points around the carrier, the disks 23 and 24 are joined by heavy tie bolts 34 spaced outwardly from the shaft. The plates 25 and 26 are similarly tied together at their corners by bolts 35.

The invention contemplates a novel construction and arrangement of the tools of each set 17 to permit the piercing and trimming operations to be performed simultaneously. Herein, the trimming is effected by the coaction of opposed dies 37 and 38 (Figs. 7 to 15) of identical construction having hexagonal holes 39 extending therethrough and conforming to external contour desired in the finished nut. The die 37 is stationary and clamped by a nut 40 onto the shouldered end of a sleeve 41 detachably secured in a second sleeve 42 which is fixed to the inner face of the carrier disk 23.

The other trimming die 38 (Fig. 12) is clamped by a nut 42ª against a tubular projection on a head 43 slidably guided for axial movement by the wall 48 of a recess in the inner face of the disk 24. Two rods 44 adjustably positioned by set screws 45 project outwardly through the disk and at their ends carry follower rollers 46 that ride around similar concentric cams 48 secured by screws to the inner face of the plate 26 (Fig. 3) and shaped to advance the die 38 from the retracted position shown in Figure 7 to and away from the position shown in Fig. 8 in which the die edge 38ª is disposed close to the edge 37ª of the stationary die 37. Retraction of the die head 43 is effected by a cam 100 (Figs. 14 and 24) facing outwardly from the plate 26 and acting on a second follower roller 101 carried by the follower rod 44. The cam 100 is formed on the flange of a bar 102 secured to the plate 26. It will be observed that in the retracted position of the movable die 38 shown in Fig. 7, both of the active edges 37ª and 38ª are spaced outwardly from the medial plane 53 (Figs. 3, 6 and 7) between the two die supports.

To insure complete removal of the trimmed off ring 15 and avoid leaving any flash around the periphery of the finished nut, opposite end portions of the blank are trimmed by the respective die edges 37ª and 38ª (see Fig. 8) and then the blank is forced through one of the edges (see Fig. 9) and thus completely separated from the trimming 15. For this purpose, a pusher 61 (Figs. 7 to 9, 12 to 15, and 18) is associated with the die 38 and arranged to be actuated by a cam 62 in proper relation to the die movements. The pusher comprises a tube of hexagonal cross section projecting through and slidable in the die 38. A head 63 on the outer end of the tube is guided in an axial bore 64 of the die head 43 and bears against a sleeve 65 whose outer end abuts a follower rod 66. The latter is slidable endwise in the disk 24 and its outer L-shaped end carries a roller 67 riding the cam 62 which comprises an arcuate bar secured to the plate 26.

Punching of the center hole 11 is effected by male and female dies 49 and 50 telescoped within and slidable relative to trimming dies. The female die comprises a tube sharpened to a circular edge 51 (Fig. 7) of a diameter equal to that of the hole to be formed. At its rear end, the tube 50 is threaded onto a sleeve 54 which abuts the end of a rod 55 (Figs. 12 and 22) slidable in guide bushings 56 supported in the disk 23. The enlarged outer end 57 of the rod 55 carries a roller 58 which bears against an arcuate cam 59 secured by screws 60 (Fig. 3) against the inner face of the frame plate 25. The die 50 is retracted into the trimming die 37 by a compression spring 68.

The punch 49 comprises a rod slidable in the bore of the pusher tube 61 and threaded at its outer end into an end recess in a rod 69 which is guided for endwise movement in the sleeve 65. An offset portion of the rod projects outwardly and carries a roller 70 which rides in a cam groove 71 extending around the side of the cam bar 62. The active cutting edge 49ª of the punch is sized to fit closely into the bore of the female die 50 as it enters the latter following completion of the punching of the slug 14.

After the punch 49 and the die 50 have retracted and the finished nut has been pushed out of the die 37 by the die 50, the slug is ejected by a pin 73 slidable in a bore through the die tube 50. A head 74 on the ejector pin slides in the sleeve 54 and is urged in the ejecting direction by a compression spring 75 this motion being limited by engagement of the head and the outer end of the die 50 as shown in Fig. 12. At this time, the active end of the ejector pin projects outwardly beyond the end of the die 50. With the parts thus in abutment, the pin moves with the die tube 50 and thus is controlled by the cam 59.

Movement of the pin 73 independently of the die 50 to push the slug 14 outwardly from the end of the die is effected by short arcuate cams 77 (Figs. 3, 15, 20, 21 and 24) secured to the cam 59. The rises 78 on the cams 77 are positioned for engagement with follower pins 79 which straddle the cam 59 and are slidable in the head 57 of the follower rod 55. The inner ends of the pins 79 bear against lugs 80 on opposite sides of a collar 81 (Figs. 14, 22 and 23) encircling and slidable along the rod 55. At its other end, the collar bears against a crossbar 82 which is disposed in a slot 83 bearing against the outer end of a pin 84 slidable endwise in the rod 55 and projecting into the end of the sleeve 54 normally short of the end of the ejector pin. The collar 81 is normally retracted by a spring 85 to the position shown in Figs. 14 and 22, the pin 84 then being spaced from the ejector. As the follower pins 79 ride up the slopes 78 of the cams 77, the collar 81 is shifted to the right as viewed in Fig. 15 and, through the pin 84, the ejector is pushed outwardly to project its end from the end of the die 49 and thus force the slug 14 out of the bore of the latter.

In accordance with an important aspect of the present invention, the nut blanks 10 are delivered automatically one by one into a loading position (Figs. 4, 5, 6 and 24) which is passed by the tools of each set 17 when they are separated, and devices 86 and 87 for gripping and centering the blank are associated with each set of tools and actuated at a time such as to enter the recesses 13 of the blank in loading position and not only pick up the blank but also to center the blank with respect to the associated tools. To these ends, a supply of the blanks is stored in a hopper 88 (Figs. 3 and 4) and, by agitating and alining mechanism 89 or that disclosed in my copending application Serial No. 331,428, filed January 15, 1953, now abandoned, are arranged in edge to edge relation and delivered by gravity into a guideway 90 (Figs. 5 and 6ª) within an elongated chute 91 which projects downwardly into the upper part of the tool path 22 (Figs. 4 and 5) preferably on the rise thereof.

At its lower end, the guide 90 is closed by a stop 92 (Fig. 5) whose active surface 93 parallels the path 22 of the tool axes and extends a short distance along the latter. The stop has an adjustable pin and slot connection 94 (Figs. 5 and 6ª) with the chute proper so that the position of the surface 93 may be adjusted to bring the axis of the terminal blank into precise coincidence with the circular tool path 22 and thus define the loading position of the blank. The stop and the lower end of the chute are of course relatively narrow and the surface 93 is preferably shaped to mate with the tapered periphery of the blank and hold the same accurately in the medial plane 53. Thus as shown in Fig. 6, the upturned side walls 93ª of the guide 93 engage opposite sides of the narrow blank around part of the periphery of the latter and thus act positively to prevent axial displacement of the blank while the latter is disposed in terminal position shown in Fig. 5.

To permit the terminal blank resting against the stop surface 93 to be picked up by the gripping devices 86 and 87 and transferred out of the loading position, the blank guideway 90 is formed with a circumferential opening 95

(Fig. 5) facing in the direction of turning of the tool carrier. For this purpose, one wall of the guideway is terminated short of the stop surface by an amount somewhat greater than the diameter of the blank. It will be apparent that when the terminal blank has been gripped and shifted out of the chute through the opening 95, the entire row of blanks will gravitate downwardly through the chute 91 until another blank is disposed in loading position against the stop surface 93. In this way, another blank is fed into the loading position as fast as the leading blank is removed thus providing an automatic hopper feed that requires no attention by the operator.

The gripping devices 86 and 87 above referred to for entering the blank recesses 13 and gripping the blank in the loading position are, in the present instance, formed by the end portions of the piercing punch 49 and the ejector pin 73. These ends are coned to conform approximately to the shape of the blank recesses 13 so that the devices, in addition to gripping the blanks and carrying the same out of the chute 91, also coact with the conical walls of the recesses 13 to center the picked off blank accurately with respect to the piercing and trimming tools. The formation of the pick off devices rigid with parts of the metal removing tools is also advantageous in that the same cams 59, 77, and 71 by which these tools are actuated may also be used to pick the blank out of loading position which occurs in a part of the revolution of the carrier 18 angularly spaced from the points where the piercing and trimming operations are performed.

In view of the large radii at which the stationary cams are disposed, the projection of the punch 50 and the pin 73 toward each other may be timed so accurately in relation to the movement of the rotary tool carrier 18 that the tapered ends 86 and 87 may be entered into the recesses 13 of the terminal nut blank even though these recesses include an extremely small angle of travel of the tool carrier 18. Therefore, in spite of the fact that the gripping devices 86 and 87 move at a comparatively high speed past the blank in loading position, at least the tips of these devices will enter far enough into the blank recesses 13 to pick up and retain the blank and carry it out of the loading position. Then, as the punch and pin continue toward each other, they act on the tapered walls of the recesses to cam the blank into precise axial alinement with the piercing and trimming tools.

To detect the presence of a finished blank, the slug 14, or the trimmed ring 15 that might cling to the tools of any set before the latter again approach the loading position 20, a suitable element 105 (Figs. 3, 15, and 19) is disposed in the medial plane 53 at a point along the path 22 at which the piercing and trimming has been completed and the tools retracted to the positions shown in Fig. 15. The detector herein shown comprises the free end of a lever 106 pivoted intermediate its ends at 107 on a stationary part of the machine frame and projecting radially and inwardly beyond the path 22. A spring 107ª urges the lever into this position which is determined by engagement of a part 108 on the lever with a stop as shown in Fig. 19. If the finished blank or other part is not released properly from between the tools when the latter are retracted, the end 105 will be engaged and the lever rocked counterclockwise as viewed in Fig. 19. Such motion may be utilized to actuate a switch 109 by means of a spring 109ª connected between the lever 106 and a second lever 106ª and thus give a signal indicating that the parts are not being released from the carrier in the manner intended.

Operation

The operation of the machine will now be detailed with particular reference to Fig. 24 which is a development of the various cams 48, 59, 62, 71, 77 and 100 and Figs. 6 to 15 which show successive positions of the parts in picking one nut blank out of the loading position and completing the piercing and trimming thereof. Assuming that the tool carrier 18 is turning clockwise as viewed in Fig. 4 and that the pick-up devices 86, 87, the punching dies 49, 50, the trimming dies 37, 38, the pusher 61, and the ejector 73 of one tool set are moving upwardly around the path 22 and approaching the loading position 20 (Fig. 4), the various followers will be engaging dwell surfaces of the cams along the line 110 (Fig. 24). As a result, the punching and trimming dies and the gripping devices will be separated as shown in Figs. 12 and 15 and spaced from the medial plane 53. At this time the head 74 of the ejector pin 73 is held by the spring 75 in abutment with the die sleeve 50.

Now, as the carrier continues, the follower 67 encounters a rise 111 on the cam 62 thus initiating advance of the pusher 61. Before the tools reach the loading position, followers 46 and 70 encounter rises 112 and 113 on the cams 48 and 71 and thus initiate the advance of the trimming die 38 and the punch 49. At this time, the pointed ends of the gripping devices 86 and 87 are, as shown in Fig. 12 spaced out of contacting relation with respect to the nut blank then disposed in loading position and accurately held against lateral tilting or axial displacement by virtue of the engagement of the sides of its periphery with the converging side walls 93ª of the guide surface 93 (Fig. 6).

Just as the points of the gripping devices 86, 87 have passed the outer edges 114 of the recesses 13 of the blank then in terminal position against the stop 92, the followers 58 and 70 engage sharp rises 115, 116 on the cams 59 and 71 and, before the axes of the tools pass beyond the far edge of the recesses 13, the points of the tapers 86 and 87 at least partially enter the recesses 13 and continue on to the fully seated positions shown in Fig. 6 thereby camming the blank into precise axial alinement with the tools. During this centering action and as the blank starts to move edgewise out of the terminal position, the side walls 93ª continue to act in holding the blank in the plane 53. At this time, the pin 73 and the punch 49 project beyond the ends of the trimming dies as shown in Fig. 13. The blank is thus picked up by the tool set and carried along the stop surface 93 out of the chute 91 through the opening 95.

As the gripped blank is carried on over the top of the circular path 22, the advance of the trimming die 38, the pusher 61, and the punch 49 continue along the cam rises 117, 118 and 119 thereby advancing the blank first against the stationary trimming die 37 as shown in Fig. 7 and then forcing the blank into the latter die as the punch pierces and passes through the blank to form the slug 14 as shown in Fig. 8. In this movement, the ejector pin 73 is pushed inwardly as permitted by yielding of the spring 75. At this time, the followers will be disposed approximately on the line 120. The pusher 61 continues its advance by the cam surface 121 so as to force the trimmed nut completely into the die 37 as shown in Fig. 9 thereby completely separating the blank from the trimming 15. The piercing die 50 is retracted by its cam surface 122 far enough to permit such advance of the terminal blank into the die 37.

After the rotary carrier has traversed nearly a quarter revolution, the parts will be positioned as shown in Fig. 14, the trimming die 38 and its supporting head 43 having been retracted by the cam surface 100 which also retracts the pusher 61 as permitted by the cam surface 124. Shortly thereafter the female piercing die 50 is advanced by the cam rise 125 to force the finished blank out of the die 37 as shown in phantom in Fig. 10.

Now, as the carrier continues, the follower pins 79 encounter the cams 77 and advance the collar 81 and through the pin 84 force the ejector 73 outwardly through the die 50 as shown in Fig. 11, the slug 14 being thereby ejected with the parts in the positions shown in Fig. 15. In the remaining third of a revolution, all of the followers engage dwell surfaces on their cams.

The relative movements as above described are repeated for each set of tools as the latter passes around the stationary cams which serve all of the tool sets. It will thus be seen that twelve blanks are pierced and trimmed in each revolution of the carrier 18. Thus, by turning the carrier at a speed of 20 R. P. M. which has been found in practice to be feasible, 250 nut blanks may be handled per minute.

*Modified machine and operation*

For the finishing of other types of nuts and where an optimum production capacity of the machine above described is desired, provision may be made for positive actuation of all of the die parts in both of their directions of movement. Such a modification is shown in Figs. 25 to 29 in which the parts of the tools and blank gripping devices common to the arrangement first described are correspondingly numbered even though in some instances the precise shape or location of the part is changed.

The trimming die 38 is clamped by the nut 40 against a shim 130 in the socket of a part 38ª on the die head 43 which, as before, is advanced by the cams 48 and retracted by the cam 100. The plunger 69 carrying the punch 49 is pinned at 69ª to a bar 69ᵇ and guided in the die head 43. The follower roller 70 thereon (see Fig. 25) is made solid and seated in an arcuate socket 131 in the bar 69ᵇ. The roller is integral with a similar roller 70ª which coacts with a return cam 71ª and is integral with the cam 48. The roller 67 on the follower 66 of the cam 62 is similarly constructed, the pusher 61 being retracted by engagement of its head 63 by the part 38ª of the die 38.

At the left end of the carrier 18, the trimming die 37 is similarly seated against a shim 132 in the mounting sleeve 41. The mounting for the die 50 and the ejector 73 are the same as for the pusher 61 and the punch 49. Thus, a head 134 on the die is fastened to the end of a sleeve 135 whose outer end carries a solid roller 136 coacting with the cam 59. Similarly, the ejector 73 is secured adjustably at 137 (Fig. 25) to a plunger pinned and keyed to a slide bar 138 carrying a solid roller 139 coacting with the cam 77. Integral with the latter is a roller 140 coacting with a return cam 141. As in the case of the other followers, the roller 139 (see Fig. 26) is held in a semicircular socket 142 by overlying lips 143 and a side plate 144 that projects into a groove between the ends of the two rollers 139 and 140.

To insure full entry of the gripping devices 86 and 87 in the recesses 13 of the nut blank without the necessity of extreme precision in the shaping of the cams or positioning of the pins 49 and 73, provision is made for some yielding of one pin at the time its coned end grips the blank to be picked out of the loading position. This is accomplished as shown in Fig. 26 by forming the cam 77 with yieldable parts 77ª and 77ᵇ rigid with studs 145 slidable in the cam proper and shouldered to limit the outward positions of the cam parts. The latter are urged outwardly by compression springs 146 which are stiff enough to retain the cam positions during the initial engagement thereof by the follower roller 139 but to yield during overtravel of the gripping device 86 after the latter has become fully seated in the recess 13 of the blank which is also gripped by the device 87 while the latter is advanced but backed rigidly by the cam 71.

The operation of the machine thus modified is essentially the same as previously described, the various cams being shaped as shown in Fig. 29 to move the gripping devices 86, 87, the trimming dies 37, 38, the pusher 61, the slug die 50, and the ejector 73 through the various positions shown in Figs. 6 to 11, 25, 27 and 28. To summarize the cycle briefly, the parts are positioned as shown in Fig. 25 when the various follower rollers engage their cams along the line 150 (Fig. 29) and the set of tools approaches the loading or pick off position 20. As the die set reaches this position, the pins 49 and 73 are advanced by their cams 71 and 77, the pin 73 yielding if necessary as permitted by the cam 77ª after full seating of the gripping ends 86 and 87 of the pins in the recesses 13 of the blank in loading position. During movement of the dies through the narrow range 151, the blank is gripped and centered by the pins, the parts then being positioned as shown in Fig. 27.

As the picked up blank is carried through the range 152 (Fig. 29), the blank is transferred to the position shown in Fig. 7 by advance of the punch 49 by its cam 71. This advance is continued and the die 38 starts to advance, trimming of the blank and punching of the slug being completed at the point 153 as shown in Fig. 8. At this time, the trimming dies 37 and 38 will be in substantial abutment as shown in Fig. 8 with the flash 15 substantially severed from the blank 8. The die 50 is then advanced by the surface 154 of its cam 59 and the pusher 61 is backed up so that the trimmed blank 8 is shifted to the right as shown in Fig. 28, substantially the entire length of the blank then being disposed within the die 38. Next, the pusher 61 is advanced to the left by the surface 156 while the die 50 is retracted until the positions shown in Fig. 9 are reached, the trimmed blank being thus transferred into the die 37. The righthand tools including the punch 49 and the die 38 are retracted by the cam surfaces 157 and 158 after which the die 50 is advanced to the right by the surface 159 to eject the finished blank following which the pin 73 is projected outwardly by the surface 160 to eject the slug 14 thus completing the cycle with the tools in the positions shown in Fig. 25.

I claim as my invention:

1. A machine for operating on nut blanks having, in combination, a base, two plate-like supports upstanding therefrom in laterally spaced relation, a rotary carrier disposed between said supports and journaled at opposite ends therein to turn about a fixed horizontal axis, a plurality of sets of gripping elements and material removing tools mounted on and angularly spaced around said support, the elements and tools of each set being mounted on opposite sides of a medial plane normal to said axis and each adapted for axial movement parallel to the axis and toward and away from each other, a chute supporting a row of said nut blanks and inclined downwardly to deliver the blanks one by one and in an edgewise direction to a terminal position disposed in said plane and passed by the tools, said chute opening circumferentially in the direction of movement of said carrier, and arcuate cams fixed to the inner faces of said supports and operable on the respective tools during a part of each revolution of the carrier to actuate each set of said elements and tools to successively grip the blank in said terminal position, perform a material removing operation thereon, and then release the machined blank from the tools.

2. A machine for operating on nut blanks having, in combination, a base, two supports upstanding therefrom in laterally spaced relation, a rotary carrier disposed between said supports and journaled thereon to turn about a fixed horizontal axis, a plurality of sets of gripping and metal removing tools mounted on and spaced around said support, the tools of each set being mounted on opposite sides of a medial plane normal to said axis and adapted for relative axial movement parallel to the axis and toward and away from each other, a downwardly inclined chute supporting a row of said nut blanks and operable to deliver the blanks one by one and in an edgewise direction to a terminal position disposed in said plane and on the upwardly rising portion of the circular path described by said tool sets, said chute opening circumferentially in the direction of movement of said carrier, arcuate cams fixed to the inner faces of said supports and operable on said tools during a part of each revolution of the carrier to actuate each set of said tools to successively grip the blank in said terminal position, and perform a material removing operation thereon, and other cam means on said supports operable to release the machined blank from the tools as the blank is traversing the lower half portion of said circular path.

3. In a machine for operating on nut blanks having center recesses opening axially in opposite directions, the combination of, a carrier rotatable about a fixed axis, a pair of axially alined gripping elements paralleling said axis and mounted on said carrier for reciprocation of their adjacent ends relative to a medial plane therebetween, said adjacent ends being pointed to enter said blank recesses and cam the blank into a centered position relative to the axis of said elements, a male die formed on one of said elements, a female die surrounding the other gripping element and movable axially relative thereto, means for transferring nut blanks successively in an edgewise direction along said plane and into a terminal position in which the axis of the blank lies in the cylindrical path described by the axis of said elements during turning of said carrier, means acting on said gripping elements during turning of said carrier to project said pointed ends into both of the recesses of the blank as the elements move past the recesses of the blank in said terminal position and then seat the ends in said recesses whereby to center the picked up blank relative to said male and female dies, cam means subsequently operated by the motion of said carrier to advance at least one of said dies into telescoping relation with respect to the other die and then retract the dies to release the punched blanks, and means subsequently operating said other gripping element to push the punched out slug backwardly and eject the same from said female die.

4. A machine for piercing and trimming nut blanks having, in combination, a support mounted to rotate about a fixed horizontal axis, a plurality of sets of elements mounted on said support in equally spaced relation to traverse a common circular path concentric with said axis and lying in a vertical plane, each of said sets including a centering point and male and female dies mounted for relative axial movement parallel to said axis and toward and away from each other and operable to punch a hole and trim the exterior of one of said blanks, a chute supporting a row of said nut blanks and operable to deliver the same one by one into said path, said chute opening circumferentially of the path and in the direction of movement of said support, and mechanism actuated by the motion of said support and operable during a part of each revolution thereof to move the elements of both of said sets axially relative to each other and successively grip the terminal one of said blanks in said chute, punch out the center of the nut blank, trim the exterior thereof, and finally release the trimmed blank.

5. In a machine for operating on nut blanks having center recesses opening axially in opposite directions, the combination of, a carrier rotatable about a fixed axis, a pair of axially alined elements paralleling said axis and mounted on said carrier for reciprocation of their adjacent ends relative to a medial plane therebetween, said adjacent ends being pointed to enter said blank recesses and cam the blank into a centered position relative to the axis of said elements, a male die formed on one of said elements and axially spaced from the pointed end of the element, a female die surrounding the other element and movable axially relative thereto, means for transferring nut blanks successively in an edgewise direction along said plane and into a terminal position in which the axis of the blank lies in the cylindrical path described by the axis of said elements during turning of said carrier, means acting on said elements during turning of said carrier to project said pointed ends into the recesses of the blank as the elements move past the recesses of the blank in said terminal position and then seat the ends in said recesses whereby to center the picked up blank relative to said male and female dies, and cam means subsequently operated by the motion of said carrier to advance at least one of said dies into telescoping relation with respect to the other die and thereby to punch out the center of the blank and leave a hole therein.

6. In a machine for operating on nut blanks having center recesses opening axially in opposite directions, the combination of, a carrier rotatable about a fixed axis, a pair of axially alined elements paralleling said axis and mounted on said carrier for reciprocation of their adjacent ends relative to a medial plane therebetween, said adjacent ends being tapered to enter said blank recesses, a male die formed on one of said elements, a female die surrounding the other element, means for transferring nut blanks successively in an edgewise direction along said plane and into a terminal position in the cylindrical path described by said elements during turning of said carrier, stationary cam means acting on said elements during turning of said carrier to project said tapered ends into the recesses of the blank as the elements move past said terminal position whereby to pick up the blank therein, and other cam means subsequently operating to advance at least one of said dies into telescoping relation relative to the other die to punch out the center of the blank and leave a hole therein.

7. In a machine for operating on nut blanks having center recesses opening axially in opposite directions, the combination of, a carrier rotatable about a fixed axis, a pair of axially alined elements paralleling said axis and mounted on said carrier for reciprocation of their adjacent ends relative to a medial plane therebetween, said adjacent ends being tapered to enter said blank recesses and one of said elements being a tool for removing metal from the central part of said blank, a stationary holder disposed in said plane and operable to support and guide successive ones of said nut blanks in an edgewise direction along said plane and into a terminal position in the cylindrical path described by said elements during turning of said carrier, means for delivering nut blanks successively to said holder, said holder having an opening facing circumferentially of said path to permit the transfer of the terminal blank laterally out of the holder, and stationary cam means extending around said axis and acting on said elements during turning of said carrier to space said tapered ends apart as they approach the terminal blank held in said holder and then project the ends into the recesses of the blank as the elements move past the holder whereby to transfer the blank out of the holder through said opening, said cam means acting on the picked-off blank in the continued movement of the carrier to shift said tool axially into operative association with the centered blank.

8. In a machine for operating on nut blanks having centering recesses opening axially in opposite directions, the combination of, a carrier rotatable about a fixed axis, a pair of axially alined elements paralleling said axis and mounted on said carrier for reciprocation of their adjacent ends relative to a medial plane therebetween, said adjacent ends being tapered to enter said blank recesses, a tool on one of said elements for removing metal from the central part of said blank, a stationary holder disposed in said plane and operable to support and guide successive ones of said nut blanks in an edgewise direction along said plane and into a terminal position in the cylindrical path described by said elements during turning of said carrier, means for delivering nut blanks successively to said holder, said holder having an opening facing circumferentially of said path to permit the transfer of the terminal blank laterally out of the holder, stationary cam means acting on said elements during turning of said carrier to project said tapered ends into the recesses of the blank as the elements move past the holder and thereby grip the terminal blank and carry the same out of the holder through said opening, and other stationary cam means acting on said elements to advance said tool into and through the gripped blank and retract the other of said elements.

9. A machine for operating on nut blanks having, in combination, a support mounted to rotate about a fixed axis, a plurality of sets of tools mounted on said support in equally spaced relation to traverse a common circular path concentric with said axis, the tools of each set being adapted to grip a blank and perform a metal removing operation thereon and mounted for relative axial movement parallel to said axis and toward and away from each other, a chute supporting a row of said nut blanks and operable to deliver the same one by one and in an edgewise direction to a terminal position in said path, said chute opening circumferentially of said path in the direction of movement of said support, and stationary cams at opposite ends of said support extending around said axis and operable during a part of each revolution of the support to actuate said tools selectively to successively grip the blank in said terminal position, perform a material removing operation thereon, and then release the machined blank.

10. A machine for piercing and trimming nut blanks having, in combination, a support mounted to rotate about a fixed axis, a plurality of sets of elements mounted on said support in equally spaced relation to traverse a common circular path concentric with said axis, each of said sets including a pair of opposed movable gripping devices and male and female dies surrounding said devices and mounted for relative axial movement parallel to said axis and toward and away from each other to punch a center hole in and trim the exterior of the blank supported by the associated gripping devices, a chute supporting a row of said nut blanks and operable to deliver the same one by one into said path, said chute opening circumferentially of the path and in the direction of movement of said support, and means actuated by turning of said support and operable during a part of each revolution of the support to actuate each set of said elements and successively grip the terminal one of said blanks in said chute, punch out the center of the nut blank, trim the exterior thereof, and finally release the trimmed blank.

11. A machine for operating on nut blanks having, in combination, a support rotatable about a fixed axis, a plurality of sets of tools mounted on said support to traverse a common circular path concentric with said axis, the tools of each set being mounted for relative axial movement parallel to said axis and toward and away from each other to grip a blank and also perform a metal removing operation thereon, means supporting a row of said nut blanks and operable to advance the same edgewise into said path, said means including a chute holding the terminal blank in a predetermined position in said path and having an opening facing circumferentially of the path in the direction of turning of said support, and mechanism operable during a part of each revolution of said support to actuate each set of said tools to successively pick up and grip the blank in said terminal position, perform a material-removing operation thereon, and then release the machined blank.

12. In a machine for operating on nut blanks having center recesses opening axially in opposite directions, the combination of, a carrier rotatable about a fixed axis, a pair of axially alined gripping elements paralleling said axis and mounted on said carrier for movement of their adjacent ends toward and away from a medial plane therebetween, said adjacent ends being tapered to enter said blank recesses and cam the latter laterally into a centered position of axial alinement with said elements, an outwardly facing stop disposed in said plane adjacent the cylindrical path described by said elements whereby to position a blank with its axis lying substantially in said path, means for guiding successive nut blanks edgewise to pick-off position against said stop, while permitting movement of the blank circumferentially along said path out of such position, guides lying along opposite sides of said blank in said terminal position and engaging a peripheral portion of the blank on opposite sides thereof to hold the blank positively against axial displacement, and means acting on said elements during turning of said carrier to move both of said adjacent ends toward said medial plane and into the recesses of the blank as the elements move past said stop and then continue the advance of the elements to seat said tapered ends in said recesses and thereby clamp the blank between the ends.

13. In a machine for operating on work blanks having center recesses opening axially from opposite sides thereof, the combination of, a carrier rotatable about a fixed axis, means for rotating said carrier continuously, two axially alined gripping elements paralleling said axis and mounted on said carrier for movement relative thereto toward and away from each other and a medial plane between the adjacent ends of the elements, said ends being tapered to points substantially smaller than the diameter of said recesses so as to be capable of entering the recesses of a blank when offset laterally from the center of such blank, a stationary holder disposed in said plane and operable to support and guide successive ones of said blanks in an edgewise direction along said plane and into a terminal position in the cylindrical path described by said elements during turning of the carrier, means for delivering blanks successively to said holder, said holder having an opening facing circumferentially of said path to permit the transfer of the terminal blank laterally out of the holder, guide means lying alongside of said blank when disposed in said terminal position and acting positively on the latter to locate the same in said plane and thereby prevent tilting or axial displacement of the held blank relative to the plane, and mechanism acting in timed relation to the turning of said carrier to moves both of said adjacent ends toward each other and said medial plane and substantially simultaneously enter both of the tips of said points into the recesses of said terminal blank while the tips are passing the recesses of such blank and are disposed within the maximum diameter of the recesses, said mechanism acting after entry of said tips in said recesses to continue the advance of said elements to seat said adjacent ends in said recesses and thereby cam the picked off blank into centered relation with respect to the axis of said elements.

14. A machine as defined in claim 8 in which said metal removing tool is rigid with one of said tapered element ends and coacts with a second tool surrounding the other tapered end to effect the metal removal.

15. A machine as defined by claim 8 having means engageable with the blank in said terminal position and acting positively thereon to hold and locate the blank in said medial plane until said tapered ends have entered said recesses and thereby obtained positive control of the blank for transferring the latter edgewise out of said holder.

16. A machine as defined by claim 11 having means engageable with at least one side of said terminal blank at the periphery thereof when the blank is disposed in said terminal position and operable to hold the blank positively against tilting or axial displacement pending picking up of the blank by said tools.

References Cited in the file of this patent
UNITED STATES PATENTS

| | | |
|---|---|---|
| 456,440 | Shimer | July 21, 1891 |
| 800,350 | Aaslaud | Sept. 26, 1905 |
| 947,724 | Wood | Jan. 25, 1910 |
| 1,485,590 | Brenzinger | Mar. 4, 1924 |
| 1,892,363 | Raule | Dec. 27, 1932 |
| 1,980,440 | Rupple | Nov. 13, 1934 |
| 2,006,100 | Hight et al. | June 25, 1935 |
| 2,218,541 | Kronquest | Oct. 22, 1940 |
| 2,438,363 | Friedman | Mar. 23, 1948 |
| 2,692,535 | Praeg | Oct. 26, 1954 |
| 2,750,716 | Sangster | June 19, 1956 |